(12) United States Patent
Yokoyama et al.

(10) Patent No.: US 8,968,096 B2
(45) Date of Patent: Mar. 3, 2015

(54) GAME SERVER AND PLAYER CONTROL PROGRAM

(75) Inventors: Ayako Yokoyama, Tokyo (JP); Jin Fujisawa, Tokyo (JP)

(73) Assignee: Square Enix Co., Ltd., Tokyo (JP)

( * ) Notice: Subject to any disclaimer, the term of this patent is extended or adjusted under 35 U.S.C. 154(b) by 91 days.

(21) Appl. No.: 13/289,237

(22) Filed: Nov. 4, 2011

(65) Prior Publication Data

US 2012/0052956 A1     Mar. 1, 2012

(30) Foreign Application Priority Data

Feb. 12, 2010   (JP) .................................. 2010-268905

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2011.01) |
| *A63F 13/30* | (2014.01) |
| *A63F 13/40* | (2014.01) |

(52) U.S. Cl.
CPC ................. *A63F 13/12* (2013.01); *A63F 13/10* (2013.01); *A63F 2300/5533* (2013.01); *A63F 2300/807* (2013.01); *A63F 2300/407* (2013.01); *A63F 2300/558* (2013.01); *A63F 2300/634* (2013.01)
USPC .......................................................... 463/42

(58) Field of Classification Search
CPC ...... A63F 13/80; A63F 13/822; A63F 13/847
USPC ............................................................ 463/42
See application file for complete search history.

(56) References Cited

FOREIGN PATENT DOCUMENTS

JP      2004-008764      1/2004

OTHER PUBLICATIONS

Lummis, Michael and Vanderlip, Danielle, "World of Warcraft Official Strategy Guide", Pearson Education, 2004, pp. 25-26.*
World of Warcraft Wikipedia Page, Oct. 30, 2010, <http://en.wikipedia.org/w/index.php?title=World_of_Warcraft&oldid=393854104>.*

* cited by examiner

*Primary Examiner* — Milap Shah
*Assistant Examiner* — Jason Pinheiro
(74) *Attorney, Agent, or Firm* — Duane Morris LLP

(57) ABSTRACT

A game server through which a game can be played by operating one's own operation character in a virtual space therein, has a memory that stores an attainment state of a succeeding quest every each player every partial quest, controller that controls not to execute the partial quest that has been already cleared again, judger that judges whether each game terminal is able to execute the partial quest when inputting an order entry notice showing execution of the partial quest through cooperation play, and a changer that rewrites and changes attainment state of the partial quest into "before execution of quest" for the game terminal judged to be impossible to execute such a partial quest so as to execute the partial quest.

7 Claims, 4 Drawing Sheets

FIG. 2

QCT

| PLAYER ID | SUCCEEDING QUEST A | | | | |
|---|---|---|---|---|---|
| | 1 | 2 | 3 | 4 | 5 |
| 12345 | CLEARED | CLEARED | CLEARED | CLEARED | DURING ORDER ENTRY |
| 23456 | CLEARED | BEFORE ORDER ENTRY | BEFORE ORDER ENTRY | BEFORE ORDER ENTRY | BEFORE ORDER ENTRY |
| 78901 | CLEARED | CLEARED | CLEARED | BEFORE ORDER ENTRY | BEFORE ORDER ENTRY |

FIG. 3

QCT

| PLAYER ID | SUCCEEDING QUEST A | | | | |
|---|---|---|---|---|---|
| | 1 | 2 | 3 | 4 | 5 |
| 12345 (1A) | CLEARED | DURING ORDER ENTRY | BEFORE ORDER ENTRY | BEFORE ORDER ENTRY | BEFORE ORDER ENTRY |
| 23456 (1B) | CLEARED | DURING ORDER ENTRY | BEFORE ORDER ENTRY | BEFORE ORDER ENTRY | BEFORE ORDER ENTRY |
| 78901 (1C) | CLEARED | DURING ORDER ENTRY | BEFORE ORDER ENTRY | BEFORE ORDER ENTRY | BEFORE ORDER ENTRY |

QCT

| PLAYER ID | SUCCEEDING QUEST A | | | | |
|---|---|---|---|---|---|
| | 1 | 2 | 3 | 4 | 5 |
| 12345 | CLEARED | CLEARED | CLEARED | CLEARED | BEFORE ORDER ENTRY |
| 23456 | CLEARED | CLEARED | BEFORE ORDER ENTRY | BEFORE ORDER ENTRY | BEFORE ORDER ENTRY |
| 78901 | CLEARED | CLEARED | CLEARED | BEFORE ORDER ENTRY | BEFORE ORDER ENTRY |

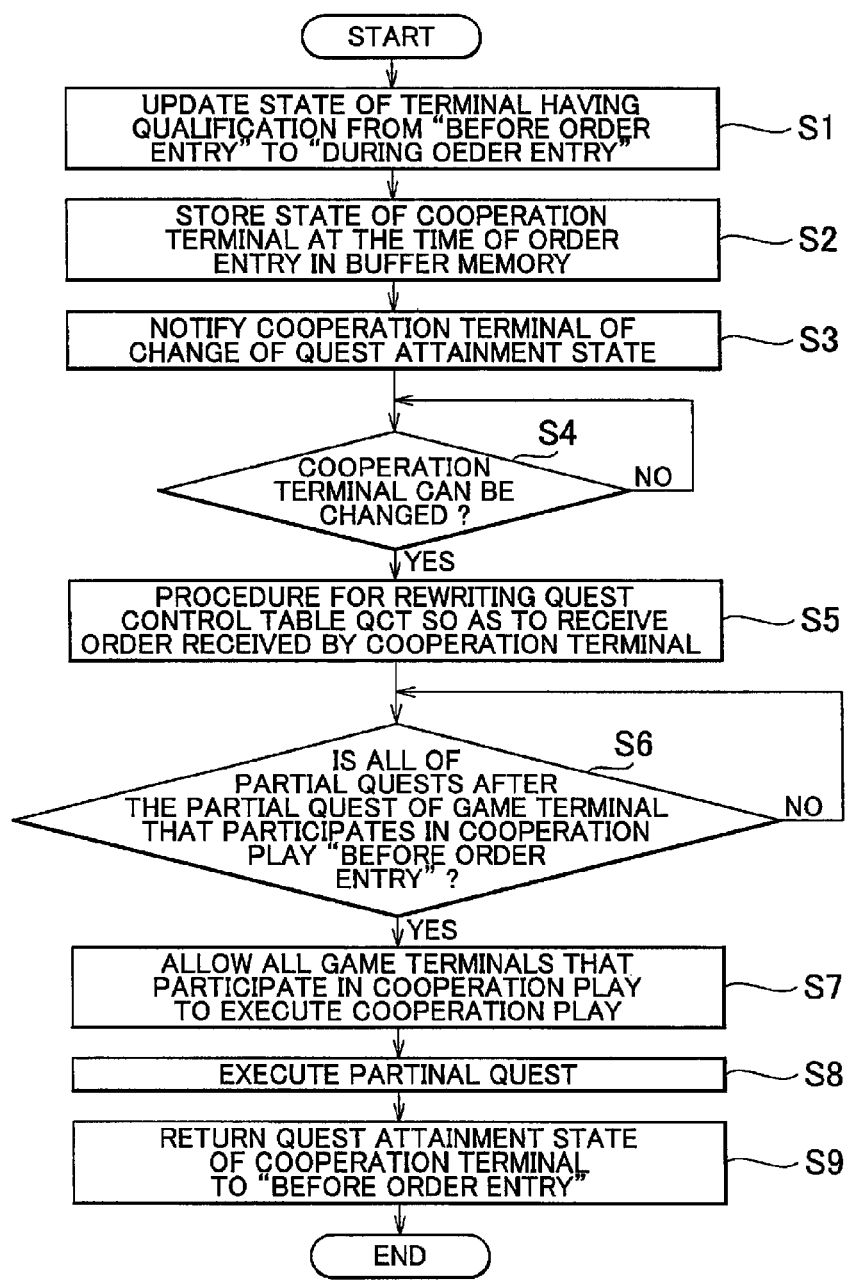

GAME SERVER AND PLAYER CONTROL PROGRAM

CROSS REFERENCE TO RELATED APPLICATION

The present disclosure relates to subject matter contained in Japanese patent application No. 2010-268905 filed on Dec. 2, 2010, the disclosure of which is expressly incorporated herein by reference in its entirety.

TECHNICAL FIELD

This invention relates to a game server connected with many players through a communication line, through which the players can enjoy an online game and player control program proper for use in the game server (game server computer).

BACKGROUND ART

Recently, so-called MMORPG (Massively Multiplayer Online Role-Playing Game) for enjoying a role-playing game in a virtual space set in a game server with which many players are connected through a communication line is now widespread.

In many cases in the RPG (role-playing game), an operation character operated by a player runs various kinds of risks (does quests) according to a game scenario set in a game program (see patent related document 1 shown below). One of such quests can be attained only by clearing one scenario, and another quest is so-called succeeding quest wherein the whole quest can not be attained until two or more partial quests are cleared in a predetermined order.

PRIOR ART

[Patent related document 1]: Japanese patent application publication No. 2004-8764

In MMORPG, the operation characters operated through many players are located in a virtual space of the server, and such operation characters take actions in the virtual space according to instructions from the players through their game terminals. Therefore, the operation characters normally become acquainted with each other, talk each other and take actions together in the virtual space.

In a scenario of MMORPG, quests are normally set, and the above-mentioned succeeding quest may be set. In a case of such a quest, an individual operation character operated by individual player (game terminal) generally receives an order of such a quest and executes the quest, and in order to control states of execution of the quests for each player (game terminal), whether the player (game terminal) cleared some quest, or is clearing the quest ("during order entry" hereinafter) or has not yet executed the quest ("before order entry" hereinafter), the game server stores a quest execution control table storing the states of execution of the quests in memory, such as a hard disc every each player (game terminal).

In a case where the quest is the succeeding quest, it is necessary to receive orders of two or more partial quests comprising the succeeding quest and to execute these quests in a predetermined order determined in a scenario (game program) so as to be cleared. In the case of the partial quests which sequences of receiving orders are determined in the game program, contents of the partial quests are closely related to each other. For example, the first partial quest is the quest "gather materials for cakes", the second partial quest is the quest "bake a cake with the materials for cakes gathered in the first partial quest", and the third partial quest is the quest "deliver the cake baked in the second partial quest to a friend". In such a case, the game program controls to execute the first partial quest, the second partial quest and the third partial quest in these orders, and the game program controls the player who has cleared the third partial quest not to receive the order of the first partial quest again, for example.

If it is possible to receive the order of the first partial quest again, the state that "the first partial quest has been cleared" should be changed into the state "before order entry" wherein it is possible to receive the order of the quest. If the first partial quest is changed into "before order entry", the control of proceeding of the scenario fails and it is impossible to proceed with the proper scenario since the second and third partial quests that have been already cleared are premised on "cleared" state of the first partial quest. For this reason, in a conventional control method in the succeeding quest, the order of the partial quest that has once been cleared is controlled not to be received again in order to prevent the failure of the scenario proceeding.

Problems to be Solved by Invention

In MMORPG, the player often becomes acquainted with another player via the operation character and executes the quest together with another player (cooperation play) in the virtual world of the game. On the other hand, the states of execution of the quests are different from each other among the respective players in many cases. In such a method that the order of the partial quest that has been already cleared of the succeeding quest is controlled not to be received, the player who has already cleared such a partial quest is not able to receive the order of such a partial quest and to do the cooperation play with the player who has not yet cleared, and attractions of MMORPG may be damaged thereby.

An object of the invention is to provide a game server and player control program wherein in the succeeding quest of an on-line game, such as MMORPG, the player who has once cleared the partial quest is able to receive the order of such a partial quest and to do a cooperation play with another player without failing scenario proceeding.

Means for Solving Problems

A first aspect of the invention is a game server connected with many game terminals (1A, 1B, 1C . . . ) through a communication line (2), through an operation of said game terminal by each player, said player can play a game online by operating his (her) own operation character in a virtual space in said game server (3), said game setting a succeeding quest that is comprised of two or more partial quests therein, said partial quests being determined so as to be executed in a predetermined order and being determined to be executed through a cooperation play to be done in cooperation with said two or more players, said game server comprising:

a memory (11) that stores attainment information that shows a state of attainment of said succeeding quest for each said player every partial quest of said succeeding quest;

an execution controller (9) that controls not to execute said partial quest that has already been cleared by said player again based upon said attainment information;

an execution judger (9) that judges whether or not each said game terminal is able to execute said partial quest based upon said attainment information of said quest corresponding to said game terminal when two or more game terminals input order entry notices showing execution of said partial quest through cooperation play;

an order entry state changer (9) that rewrites and changes all of states of attainment of said partial quests after the partial quest of the game terminal that was judged to be impossible to execute into "before execution of quest" so as to execute said partial quest;

a cooperation play allower (9) that allows two or more said game terminals to execute said partial quest through cooperation play by said two or more game terminals in the rewritten and changed attainment state.

A second aspect of the invention is the game server further comprising:

a temporary memory that temporarily stores said attainment information of said succeeding quest of said game terminal that was judged to be impossible to execute said partial quest at the time when two or more said game terminals input said order entry notices showing execution of said partial quest through cooperation play; and an attainment information recoverer (9) that recovers said attainment information of said succeeding quest of said game terminal that was judged to be impossible to execute said partial quest into one at the time when inputting said order entry notice based upon said attainment information of said succeeding quest stored in said temporary memory for said game terminal that was judged to be impossible to execute said partial quest after said cooperation play through two or more said game terminals.

A third aspect of the invention is the game server, wherein said attainment information of said partial quest stored in said memory is stored, being divided into three cases, 1) in a case where said player has already cleared said partial quest, 2) in a case where said player is receiving an order of said partial quest, and 3) in a case where said player has not yet been received an order of said partial quest.

Effects of Invention

According to the invention, when executing the partial quest of the succeeding quest through cooperation play by two or more players, the order entry state changer (9) that rewrites the attainment information of the succeeding quest of the game terminal judged to be impossible to execute the partial quest by the execution judger (9) in such a manner that all attainment states of the partial quests after such a partial quest are changed into "before execution of quest" so as to execute partial quest, so that the execution limiter (9) does not limit the execution of such a partial quest and the player who has already cleared such a partial quest is able to receive the order of the partial quest without failing the scenario proceeding and to do cooperation play with another players in various levels.

Besides, even if the order entry state changer (9) rewrites all states of attainment of the partial quests after some partial quest into "before execution of quest" when executing the partial quest through cooperation play, the attainment information recoverer (9) recovers the attainment information of the succeeding quest to one at the time of inputting the order entry notice after the cooperation play, so that the game terminal that has already cleared such a partial quest is able to do cooperation play with another players without damaging one's own clear record.

The number in parentheses shows the corresponding element in the drawings for the sake of convenience, accordingly, the descriptions are not restricted and bound by the descriptions on the drawings.

BRIEF DESCRIPTION OF DRAWINGS

FIG. 2 is a view that shows an example of a succeeding quest control table.

FIG. 3 is a view that shows a state after update of table shown in FIG. 2.

FIG. 6 is a flowchart that shows an example of procedures of cooperation play during game program.

PREFERRED EMBODIMENT

An embodiment of the invention is now explained, referring to appended drawings.

Figure 1:
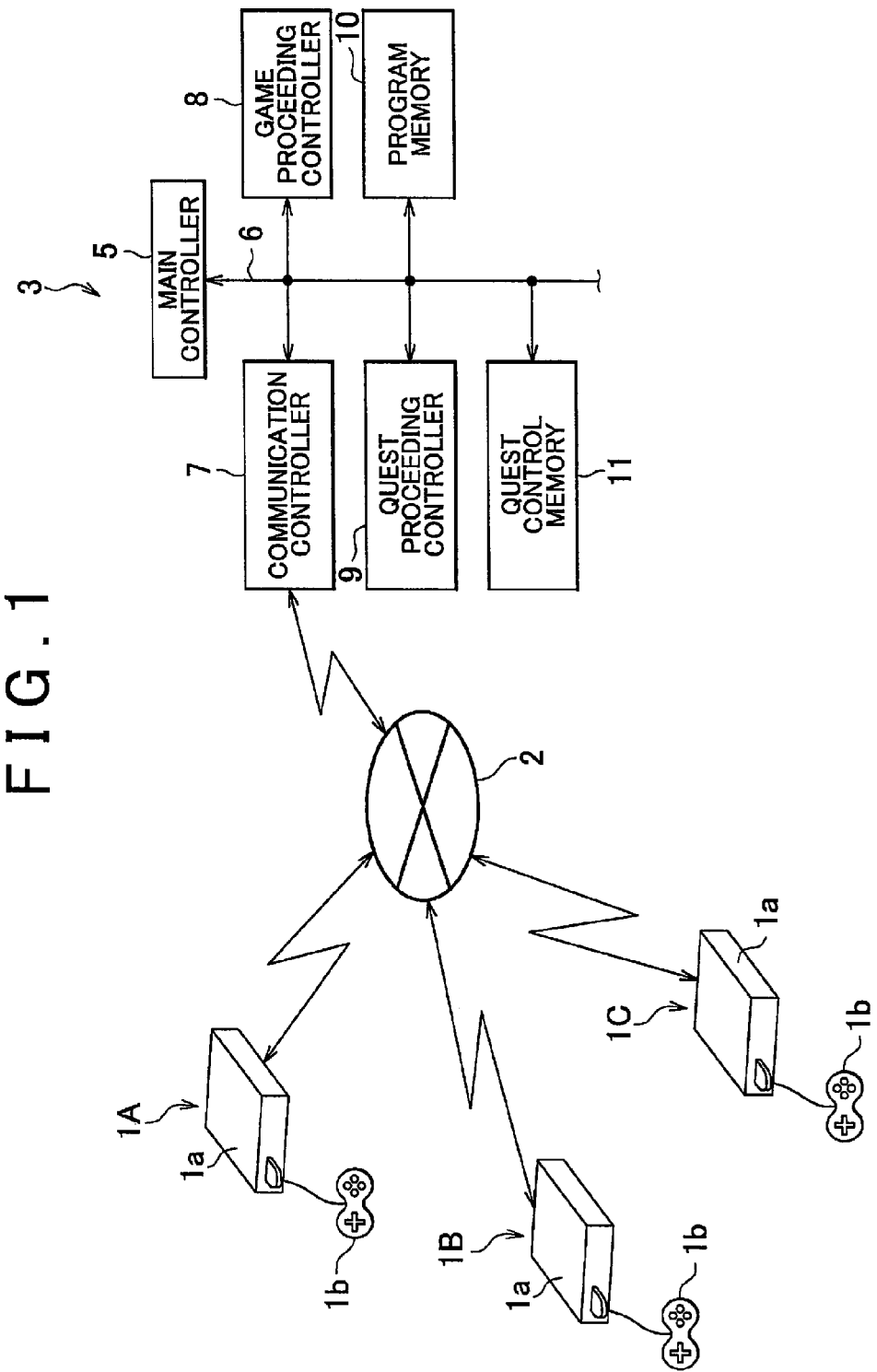
FIG. 1 is a control block diagram that shows game apparatuses and a game server to which the invention is applied.

FIG. 1 shows two or more game terminals 1A, 1B, 1C . . . (Actually, extremely many game terminals 1 exist although the figure exemplarily shows only three game terminals 1) and a game server 3 connected with the game terminals 1A, 1B, 1C via a public communication line 2, such as the Internet and a public telephone line. Each of the game terminals 1A, 1B, 1C . . . has a main body 1a building a computer therein and a controller 1b as an input device is connected with the main body 1a.

The game server 3 as the game server computer has a main controller 5, and a communication controller 7 connected with the public communication line 2, a game proceeding controller 8, a quest proceeding controller 9, a program memory 10 for storing game program of MMORPG, and a quest control memory 11 are connected with the main controller 5 via a bus line 6. FIG. 1 exemplarily shows only portions pertinent to the invention, but does not show the whole structure of an actual game server 3.

The game server 3 as shown in FIG. 1 executes functions shown in respective blocks as shown in FIG. 1 in such a manner that a computer reads and executes game program and the other well-known control program stored in a memory, such as the program memory 10 so that a CPU or a memory (not shown) time-dividedly operates by multitask. But, it is also possible to structure the game server 3 by hardwares corresponding to the respective blocks. Otherwise, it is also possible to control each block by a CPU or a MPU dispersedly provided in each block.

The game terminal 1 and the game server 3 have the above-mentioned structures. In order to play an online game, such as a MMORPG for players, each player operates his (her) own game terminal 1 so as to connect with the game server 3 through the public communication line 2, and executes the game in such a manner that the player operates to move an operation character that is set corresponding to each player in a virtual space formed in a memory in the game server 3 so that the operation character take actions according to a predetermined scenario controlled by the game server 3. The game program executed by the game server 3 is stored in the game program memory 10 in the game server 3, and does main controls in the online game. In each game terminal 1, the game program for controlling the terminal for executing a desired online game by connecting with the game server 3 is stored in a predetermined memory.

Figures 4, 5:
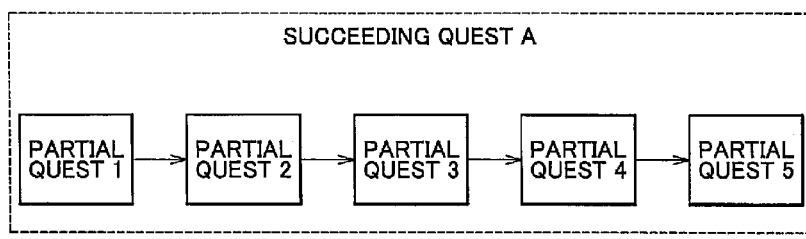
FIG. 4 is a view that shows a state after update of table shown in FIG. 3.
FIG. 5 is a typical view that shows a relation between succeeding quest and partial quest.

As mentioned above, many quests are set in the game scenario according to the game program. Among such quests, a succeeding quest comprised of two or more partial quests may be set. That is, a succeeding quest A is set as a quest that can be done in MMORPG as shown in FIG. 5, and the succeeding quest A is comprised of five partial quests 1 to 5. The quest proceeding controller 9 controls to execute the partial quests 1 to 5 in the orders of the partial quest 1→the partial quest 2→the partial quest 3→the partial quest 4→and the partial quest 5, and it is set that the player should execute the quests 1 to 5 in such an order without fail.

The quest proceeding controller 9 controls attainment states of all quests including the succeeding quest A every each player (player ID attached to each player) as a quest execution control table in the quest control memory 11, and the control state is shown as shown in FIG. 2, for example, in such a manner that "cleared" flag FG1 is stored in the memory if the player has already cleared the quest, "during order entry" flag FG2 is stored if the player is receiving the order of the quest, and "before order entry" flag FG3 is stored if the player has not yet received the order of the quest.

Among the quests, "cooperation play" to be done through two or more players cooperating with each other is set, and the succeeding quest A as shown in FIG. 5 is set as "cooperation play" to be done by three players in cooperation with each other according to the game program. Then, if the player selects to execute the succeeding quest A, that is, if the order entry of the succeeding quest A is notified (order entry notice) to the game server 3 from some game terminal (such as the game terminal 1A), the game proceeding controller 8 judges whether the order entries of the succeeding quest of a group including the game terminal 1A have been notified from the other game terminals 1 (players), and if the order entry of the succeeding quest have been notified from the other game terminals (such as the game terminals 1B, 1C), the game proceeding controller 8 reads information of attainment states of the succeeding quest every each player out of the quest execution control table of each player ID that corresponds to the game terminals 1A, 1B and 1C from which the order entry notice of the quest has been outputted by searching the quest control memory 11 at once.

If the order entry of the quest of the group including the game terminal 1A has not been notified from the other game terminal 1 (player), the game proceeding controller 8 sends a message of inviting to receive the order of the quest in cooperation with the other game terminals 1 to the game terminal 1A that outputted the order entry notice so as to secure a proper scenario proceeding.

After the order entry notices of the quest were outputted from the game terminal group of the game terminals 1A, 1B and 1C to the game server 3 and the information of attainment of the corresponding succeeding quest was read out of the quest execution control table, the quest proceeding controller 9 prepares a succeeding quest control table QCT for respective players ID corresponding to the game terminals 1A, 1B and 1C through which the order entry notices of the succeeding quest A were outputted to the game server 3 according to the game program, as shown in FIG. 2. The succeeding quest control table QCT is made by editing the information of attainment of the partial quests comprising the succeeding quest A for each player ID read out of the quest execution control table, and the quest proceeding controller 9 controls execution of the quest in the respective game terminals 1A, 1B and 1C, while referring to the states of attainment of the partial quests shown in the succeeding quest control table QCT.

That is, the quest proceeding controller 9 judges the order of which partial quest of the succeeding quest A the order entry notice outputted this time through each of the game terminals 1A, 1B and 1C receives based upon the player ID (in FIG. 2, the player ID of the game terminal 1A is "12345", the player ID of the game terminal 1B is "23456", and the player ID of the game terminal 1C is "78901") of each game terminal 1 that outputted the order entry notice of the succeeding quest A by referring to the state of attainment of the partial quests 1 to 5 of each game terminal 1 (player) in the succeeding quest A. The order entry notice from each game terminal 1 stores the partial quest that receives the order this time and information for specifying the other game terminals 1 that receives the order of the partial quest 2 together (that play the cooperation play) together with a cooperation play execution flag, and such a judgment is easy thereby.

And, the quest proceeding controller 9 judges the partial quest that the respective game terminals 1A, 1B and 1C can receive the order based upon the succeeding quest control table QCT. According to the game program, the quest proceeding controller 9 controls such that the partial quests should be executed in order starting from 1, and the partial quest that has already been cleared is not possible to be executed again, but the game program includes such a cooperation play procedure that the partial quest to be executed with another players in cooperation with each other is temporarily allowed to be executed even if the partial quest has already been cleared.

In FIG. 2 for example, in a normal control the player is receiving the order of the partial quest 5 in the game terminal 1A (the player ID is "12345") and it is not possible to receive a new order of the partial quest in the succeeding quest A and is possible to execute only the partial quest 5 which order is receiving. In the game terminal 1B (the player ID is "23456"), only the partial quest 1 has been cleared and it is possible to receive the order of only partial quest 2 next. In the game terminal 1C (the player ID is "78901"), the partial quests 1 through 3 have been cleared and it is possible to receive the order of only partial quest 4 next.

If the order entry notices outputted from the game terminals 1A, 1B and 1C are ones of receiving the order of the partial quest 2 as the cooperation play, the quest proceeding controller 9 judges which of the game terminals 1A, 1B and 1C that outputted the order entry notices has a qualification for receiving the order of the partial quest 2 from the information of attainment of the partial quests of the succeeding quest A. In such a case, the judgment is that the game terminal 1B can receive the order of the partial quest 2 (can execute the partial quest 2), and the other game terminals 1A and 1C are not possible to receive the order of the partial quest 2. If the judgment is that the order entry notice includes a notice showing that the cooperation play is done and at least one of the game terminals 1 has a qualification for receiving the order of the partial quest shown in the order entry notice, the quest proceeding controller 9 starts the cooperation play procedure based upon the cooperation play execution flag shown in each order entry notice.

As shown in FIG. 6, in the cooperation play procedure, the state of attainment of the partial quest 2 of the succeeding quest control table QCT is rewritten and updated from "before entry order" into "during order entry" for the terminal having the qualification judged to have the qualification for receiving order of the partial quest 2, that is, the game terminal 1B, in Step S1 as shown in FIG. 3. Subsequently, in Step S2 the state of attainment of the succeeding quest A at the time when the game server 3 received the order entry notices of the other game terminals 1A and 1C that have already cleared the partial quest 2 but play the cooperation play in cooperation with the terminal having the qualification, that is the game terminals 1A and 1C as the cooperation terminals is temporarily stored in a buffer memory that is not shown (temporary memory). That is, the states of attainment of the succeeding quest A of the game terminals 1A (the player ID=12345) and 1C (the player ID=78901) of the succeeding quest control table QCT of FIG. 2 are stored in the buffer memory.

Subsequently, the cooperation play procedure proceeds to Step S3, and the quest proceeding controller 9 notifies the game terminals 1A (the player ID=12345) and 1C (the player ID=78901), the cooperation terminals that the present states of attainment of the succeeding quest A are temporarily preserved and changed through the communication controller 7 and the public communication line 2. Receiving this, each cooperation terminal outputs a signal showing that the player allows to temporarily store and change the state of attainment of the succeeding quest A to the game server 3 through the controller 1b that is input means. In response to this, the quest proceeding controller 9 of the game server 3 enters Steps S4 and S5 of the cooperation play procedure, and does the procedure of rewriting the succeeding quest control table QCT so as to allow to receive the order of the partial quest the order of which the cooperation terminals received together with the terminal having the qualification.

A "cleared" flag is stored at the address of the partial quest that the cooperation terminals have already cleared in the succeeding quest control table QCT, so that the quest proceeding controller 9 is not able to allow the cooperation terminals to execute the partial quest 2 as it is since the scenario proceeding of the succeeding quest A may fail in the above-mentioned state. However, the succeeding quest control table QCT is temporarily rewritten for two or more game terminals 1 to which the cooperation play is requested through the cooperation play procedure. That is, the state of attainment of the succeeding quest A of the game terminal 1A (player ID=12345) and 1C (player ID=78901) is rewritten from "cleared-cleared-cleared-cleared-during order entry" into "cleared-during order entry-before order entry-before order entry-before order entry" for the game terminal 1A (player ID=12345) and from "cleared-cleared-cleared-before order entry-before order entry" into "cleared-during order entry-before order entry-before order entry-before order entry" for the game terminal 1C (player ID=78901). No specific procedure is done on the game terminal 1B that is the terminal having the qualification since the partial quest 2 has been updated into "during order entry" in Step S1.

The succeeding quest control table QCT has been thus rewritten and changed from the state at the time of the order entry notice of the cooperation play of FIG. 2 into the state as shown in FIG. 3, in all game terminals 1A, 1B and 1C that participate in the cooperation play, the partial quest 2 that is a subject for the cooperation play becomes "during order entry" and the partial quests 3 to 5 after the partial quest 2 become "before order entry", that is, "before execution of quest". The quest proceeding controller 9 enters Step S7 after confirming that all partial quests 3 to 5 after the partial quest 2 that is a subject of the cooperation play of all game terminals 1A, 1B and 1C that participate in the cooperation play are "before order entry" in Step S6, and allows all game terminals 1A, 1B and 1C that participate in the cooperation play to execute the partial quest 2.

Receiving this, the players of the respective game terminals 1A, 1B and 1C execute the partial quest 2 in the game server 3 (Step S8 of FIG. 6). In the succeeding quest control table QCT of the respective game terminals 1A, 1B and 1C that participate in the cooperation play, the partial quest 3 and the subsequent partial quests are "before order entry (before execution of quest)" in all game terminals 1, so that the partial quest 2 of the succeeding quest A is executed in each game terminal 1 without failing the scenario of the succeeding quest A.

When clearing the partial quest 2, the quest proceeding controller 9 enters Step S9 of the cooperation play procedure, and the state of attainment of the partial quest 2 of the terminal having the qualification, that is, the game terminal 1B in the succeeding quest control table QCT in the quest control memory 11 is changed from "during order entry" into "cleared" as shown in FIG. 4, and for the game terminals 1A and 1C, the cooperation terminals judged that it is not possible to execute the partial quest 2, the state of attainment of the quest at the time of receiving the order of the cooperation play that was stored in buffer memory in Step S2 is read out and the state of attainment of the partial quest of each cooperation terminal is recovered to the state before receiving the order of the cooperation play. Through such a procedure, the game terminals 1A and 1C that are the cooperation terminals can return to the states of attainment of the succeeding quest A before the cooperation play with the game terminal 1B. Such return operations of the states of attainment of the game terminals 1A, 1C that are cooperation terminals may be done through instructions from the respective game terminals 1A and 1C. Then, the player of the cooperation terminal may be able to receive the orders of the partial quest 2 that was done through cooperation play this time and the subsequent partial quests that have been already cleared again.

After the game terminals 1A and 1C that are cooperation terminals return to the states of attainment of the succeeding quest A before the cooperation play with the game terminal 1B and "cleared" fag is stored for the partial quest 2 that is the subject for the cooperation play in the terminal having qualification in the succeeding quest control table QCT as shown in FIG. 4, the contents of the quest execution control table in the quest control memory 11 is updated into the contents of succeeding quest control table QCT and the execution of the partial quest 2 is finished. In a case of FIG. 4, the partial quest 5 of the game terminal 1A was "during order entry" before the cooperation play of FIG. 2, but is "before order entry" after the cooperation play. In this embodiment, such a procedure is done since the game server 3 does not record the state of proceeding of the partial quest of each game terminal 1. If the quest proceeding controller 9 records the state of proceeding of the quest in each partial quest, the corresponding partial quest, the partial quest 5 in this case may be changed from "before order entry" into "during order entry" after the cooperation play so that the partial quest 5 can be restarted from a predetermined scenario position in the partial quest 5 that the game terminal 1A was executing when the game terminal 1A started the cooperation play.

The invention claimed is:

1. A game server connected with two or more game terminals through a communication line, each of the two or more game terminals having a player associated therewith, wherein each player is discrete from other players and having an operation character assigned to the player, each of said two or more game terminals configured for the player associated with said each of said two or more game terminals to play a game online by operating the player's operation character in a virtual space provided in said game server, wherein said game is a quest that is to be cleared by the players through a cooperation play session among the players, said game server comprising:

a memory unit in which attainment information representing a state of attainment of said quest for each of said players is stored, wherein the attainment information identifies whether a given player has previously cleared the quest; and a quest proceeding controller configured for:
  performing an execution controller that prevents execution of the quest for any player who has previously cleared that quest based upon said attainment information;
  performing an execution judger that determines whether or not one of the two or more game terminals is able to execute said quest, based upon said attainment information of said quest for the player associated with said one of the two or more game terminals;
  if the execution judger has determined from the attainment information for the player that the player has previously cleared said quest, and the order entry notice is for executing said quest as part of a new cooperation play session, performing an order entry state changer that changes the attainment information of said quest for the player, thus, identifying the player as not yet having cleared said quest; and
  performing a cooperation play allower that allows said two or more game terminals to execute said quest as part of the new cooperation play session.

2. The game server according to claim 1 further comprising:
  a temporary memory that temporarily stores said attainment information for the player before the attainment information is changed by said order entry state changer; and
  the quest proceeding controller further configured for performing an attainment information recoverer that restores said attainment information in said memory unit by retrieving the attainment information stored in said temporary memory upon completion of said new cooperation play session.

3. The game server according to claim 1, wherein said attainment information of said quest stored in said memory unit can be one of the following three cases, 1) a case where a player has already cleared said quest, 2) a case where a player is receiving an order for said quest, and 3) a case where a player has not yet been received an order for said quest.

4. The game server according to claim 1, wherein said quest is a succeeding quest that is comprised of two or more partial quests, said partial quests are determined to be executed in a predetermined order, said order entry notice is a notice showing said partial quest is to be executed by said new cooperation play session, and said execution judger determines whether or not said particular game terminal is able to execute said partial quest, based upon said attainment information associated with said player.

5. A computer readable non-transitory tangible medium that stores a player control program to be used in a game server computer, said game server connected with two or more game terminals through a communication line, each of the two or more game terminals having a player associated therewith, wherein each player is discrete from other players and having an operation character assigned to the player, each of said two or more game terminals configured for the player associated with said each of said two or more game terminals to play a game online by operating the player's operation character in a virtual space provided in said game server computer, wherein said game is a quest that is to be cleared by the players associated with each of the two or more game terminals through a cooperation play session among said players, said player control program, when executed by said game server computer, enables said game server computer to function as the following:
  a controller that stores attainment information in a memory, wherein the attainment information representing a state of attainment of said quest for each of said players;
  an execution controller that prevents execution of the quest for any player who has previously cleared that quest based upon said attainment information;
  an execution judger that determines whether or not one of the two or more game terminals is able to execute said quest, based upon said attainment information of said quest for the player associated with said one of the two or more game terminals, when said player inputs an order entry notice for executing said quest as part of a new cooperation play session from the one of the two or more game terminals;
  an order entry state changer that changes the attainment information of said quest for the player that inputted said order entry notice, thus identifying the player as not yet having cleared the quest, if the execution judger has determined from the attainment information for the player that the player has previously cleared said quest, and the order entry notice is for executing said quest as part of a new cooperation play session; and
  a cooperation play allower that allows said two or more game terminals to execute said quest.

6. The computer-readable non-transitory tangible medium that stores player control program according to claim 5, wherein said player control program further enables said game server computer to function as the following:
  a controller that controls to temporarily store said attainment information of said quest for the player in a temporary memory before the attainment information is changed by said order entry state changer; and
  an attainment information recoverer that restores said attainment information in said memory upon completion of said new cooperation play session by retrieving the attainment information stored in the temporary memory.

7. The computer-readable non-transitory tangible medium that stores player control program according to claim 5, wherein said attainment information of said quest stored in said memory can be one of the following three cases, 1) in a case where a player has already cleared said quest, 2) in a case where a player is receiving an order for said quest, and 3) a case where a player has not yet been received an order of said quest.

* * * * *